US011825575B2

United States Patent
Averyt et al.

(10) Patent No.: US 11,825,575 B2
(45) Date of Patent: Nov. 21, 2023

(54) PULSE-WIDTH MODULATION AND ARBITRATION FOR CONTEXTUAL AND UNIFORM LED ILLUMINATION IN USB APPLICATIONS

(71) Applicant: Microchip Technology Incorporated, Chandler, AZ (US)

(72) Inventors: Josh Averyt, Chandler, AZ (US); Shannon Cash, Cedar Park, TX (US); Matthew Kalibat, Austin, TX (US)

(73) Assignee: Microchip Technology Incorporated, Chandler, AZ (US)

( * ) Notice: Subject to any disclaimer, the term of this patent is extended or adjusted under 35 U.S.C. 154(b) by 449 days.

(21) Appl. No.: 17/013,978

(22) Filed: Sep. 8, 2020

(65) Prior Publication Data

US 2021/0084726 A1 Mar. 18, 2021

Related U.S. Application Data

(60) Provisional application No. 62/899,193, filed on Sep. 12, 2019.

(51) Int. Cl.
*H05B 45/18* (2020.01)
*H05B 45/325* (2020.01)
(Continued)

(52) U.S. Cl.
CPC ............ *H05B 45/325* (2020.01); *B60K 37/02* (2013.01); *B60Q 3/18* (2017.02); *H05B 45/18* (2020.01);
(Continued)

(58) Field of Classification Search
CPC ........ H05B 45/18; H05B 45/325; B60Q 3/18; G06F 3/162; G06F 13/385
See application file for complete search history.

(56) References Cited

U.S. PATENT DOCUMENTS 6,363,491 B1   3/2002  Endo ............................ 713/310
7,689,130 B2 * 3/2010  Ashdown ............. H04B 10/116
                                                              398/118
(Continued)

FOREIGN PATENT DOCUMENTS

CN      107172739 A      9/2017   ............. H05B 44/00
EP      3291098 A1       3/2018

OTHER PUBLICATIONS

International Search Report and Written Opinion, Application No. PCT/US2020/050040, 12 pages, dated Dec. 22, 2020.
(Continued)

*Primary Examiner* — Tung X Le
(74) *Attorney, Agent, or Firm* — SLAYDEN GRUBERT BEARD PLLC

(57) ABSTRACT

A PWM lighting bridge manages hardware PWM compensation components. One or more PWM outputs are driven based upon a master PWM input signal. The master PWM input signal is processed through a mapping function to produce a desired output signal(s) on the one or more PWM outputs. The mapping function comprises a set of compensation bins having a maxim input duty cycle, a minimum input duty cycle and an output duty cycle. The mapping process selects a bin based on determining whether the input duty cycle is within the minimum and maximum duty cycle ranges of the bins and then uses the specified output duty cycle for the one or more PWM outputs. The PWM lighting bridge provides configuration and runtime management of the hardware PWM compensation components. Read/write access to the PWM compensation bins provides customizable configurations of the input and output PWM characteristics.

21 Claims, 5 Drawing Sheets

(51) Int. Cl.
*B60Q 3/18* (2017.01)
*B60K 37/02* (2006.01)
(52) U.S. Cl.
CPC .. *B60K 2370/332* (2019.05); *B60K 2370/349* (2019.05)

(56) References Cited

U.S. PATENT DOCUMENTS

| | | | | |
|---|---|---|---|---|
| 8,093,825 | B1* | 1/2012 | Van Ess | H05B 45/14 315/294 |
| 8,476,846 | B1* | 7/2013 | Ess | H05B 45/10 315/308 |
| 8,742,686 | B2* | 6/2014 | Zampini, II | H05B 45/00 315/297 |
| 2013/0162160 | A1* | 6/2013 | Ganton | H04M 3/00 315/210 |
| 2014/0176441 | A1* | 6/2014 | Casparian | G06F 3/038 345/163 |
| 2015/0231408 | A1* | 8/2015 | Williams | A61N 5/06 607/88 |
| 2015/0318728 | A1 | 11/2015 | Ghosh et al. | 320/107 |
| 2017/0024344 | A1 | 1/2017 | Shetty et al. | 710/313 |
| 2017/0080849 | A1* | 3/2017 | Nogha Mbai | F21V 23/0464 |
| 2017/0232888 | A1 | 8/2017 | Ricci et al. | |
| 2019/0098408 | A1* | 3/2019 | Bal | G06F 3/162 |

OTHER PUBLICATIONS

Chinese Office Action, Application No. 202080063477.8, 20 pages, dated Apr. 28, 2023.

* cited by examiner

PULSE-WIDTH MODULATION AND ARBITRATION FOR CONTEXTUAL AND UNIFORM LED ILLUMINATION IN USB APPLICATIONS

RELATED PATENT APPLICATION

This application claims priority to commonly owned U.S. Provisional Patent Application Ser. No. 62/899,193; filed Sep. 12, 2019; entitled "Pulse-Width Modulation and Arbitration for Contextual and Uniform LED Illumination in USB Applications," and is hereby incorporated by reference herein for all purposes.

TECHNICAL FIELD

The present disclosure relates to vehicle lighting control and integration thereof, and, more specially, integration of light emitting diode (LED) control and luminance uniformity with an automotive universal serial bus (USB) hub comprising pulse width modulation (PWM) master arbitration.

BACKGROUND

Automotive manufacturers commonly require a multitude of back-lighted modules located across the automobile (vehicle) dashboard to exhibit approximately the same luminance as the adjacent modules. Some automobiles also contain a body control module (BCM) which commands discrete settings for lighting levels, e.g., "brightness" or "dimming," throughout the day, in correspondence with an operating mode of the automobile and/or outdoor ambient light levels. Generally, a BCM is an electronic control unit responsible for monitoring and controlling various electronic accessories in a vehicle's body. Modules which are connected to the BCM can detect the relative lighting level setting which must yield a certain back-lighting result and this result is typically calibrated at the factory in relation to adjacent module back-lighting.

Commonly, the manner in which this type of calibration is performed at the factory includes a combination of software and quantitative light-sensing equipment to identify differences in light properties which may include intensity, luminance, or other measurable properties, and then yield corrective actions to adjust the measured properties into an acceptable specified range. To date, the corrective actions have typically been implemented through making changes to the bill of materials of the module, on a per-module basis.

The BCM may only indicate the relative brightness setting for the back-lighted modules and not a context for the way the modules are illuminated. A separate device known as the "head unit" may require a USB-enabled module to modulate its lights in correspondence with contexts provided by, for example but not limited to 1) a state of the USB connection, 2) a state of the module assembly, or 3) a state of the logic executing within the head unit. A USB host/hub/device within a module which is connected to a head unit may also have reason to modulate the lights within the module for separate reasons which could supersede the context provided by the head unit, in correspondence with a state of the logic inside of the USB host/hub/device or a state of the module assembly. The intent of changing PWM-controlled lighting elements is to communicate to the end-user that a change has been detected, and the context of the change can be uniquely identified through differing and distinguishable lighting sequences, colors and/or brightness (contextual lighting visualization, e.g., depending on or relating to the circumstances that form the setting for an event, statement, or idea).

SUMMARY

Therefore, what is needed is central arbitration of lighting contexts with relation to the commanded brightness/dimming levels for back-lighted modules provided by, for example but not limited to, a body control module (BCM), an automotive USB device, or automotive infotainment head. An advantage of the invention disclosed herein includes the capability to yield corrective actions which do not alter the bill of materials, which implies module production cost savings.

According to an embodiment, an automotive universal serial bus (USB) hub having light emitting diode (LED) master arbitration may comprise: a first master providing uniformity trimming and control of a pulse width modulation (PWM) input; a second master providing event driven PWM light emitting diode (LED) control; and a third master providing a USB host to PWM bridge, wherein the first, second and third masters provide a plurality of PWM outputs.

According to a further embodiment, a PWM input of the first master may be coupled to a master PWM output from a body control module. According to a further embodiment, a voltage scaling and clamp circuit may be coupled between the body control module PWM output and the first master PWM input. According to a further embodiment, a temperature measuring device may be coupled to a first input of the second master for indicating USB device power usage. According to a further embodiment, the temperature measuring device may be a thermistor and the first input of the second master may be analog. According to a further embodiment, a USB device may be coupled to a second input of the second master.

According to a further embodiment, the USB device may be selected from the group consisting of Apple Car Play and Android Auto. According to a further embodiment, the second master provides spawned/activation indication and control of the USB device. According to a further embodiment, the third master may be coupled to a USB host. According to a further embodiment, the USB host may be an automotive infotainment head unit.

According to a further embodiment, the first master may comprise: an input PWM duty cycle detector; an input PWM duty cycle bin matching function; an output PWM duty cycle compensation function; and a PWM peripheral enables/control of PWM outputs from the first master. According to another embodiment, an automotive universal serial bus (USB) hub having light emitting diode (LED) master arbitration may comprise: a first master providing uniformity trimming and control of a pulse width modulation (PWM) input; a second master providing event driven PWM light emitting diode (LED) control; and a third master providing a USB host to PWM bridge, wherein the first, second and third masters provide a plurality of outputs for driving serial peripheral interface (SPI) slaves.

According to a further embodiment, a PWM input of the first master may be coupled to a master PWM output from a body control module. According to a further embodiment, a voltage scaling and clamp circuit may be coupled between the body control module PWM output and the first master PWM input. According to a further embodiment, a temperature measuring device may be coupled to a first input of the second master for indicating USB device power usage. According to a further embodiment, the temperature measuring device may be a thermistor and the first input of the second master may be analog. According to a further embodiment, a USB device may be coupled to a second input of the second master.

According to a further embodiment, the USB device may be selected from the group consisting of Apple Car Play and Android Auto. According to a further embodiment, the second master provides spawned/activation indication and control of the USB device. According to a further embodiment, the third master may be coupled to an automotive local interconnect network (LIN) transceiver. According to a further embodiment, the first master may comprise: an input PWM duty cycle detector; an input PWM duty cycle bin matching function; an output PWM duty cycle compensation function; and a peripheral enables/control of SPI outputs from the first master.

BRIEF DESCRIPTION OF THE DRAWINGS

A more complete understanding of the present disclosure may be acquired by referring to the following description taken in conjunction with the accompanying drawings wherein.

Figure 1:
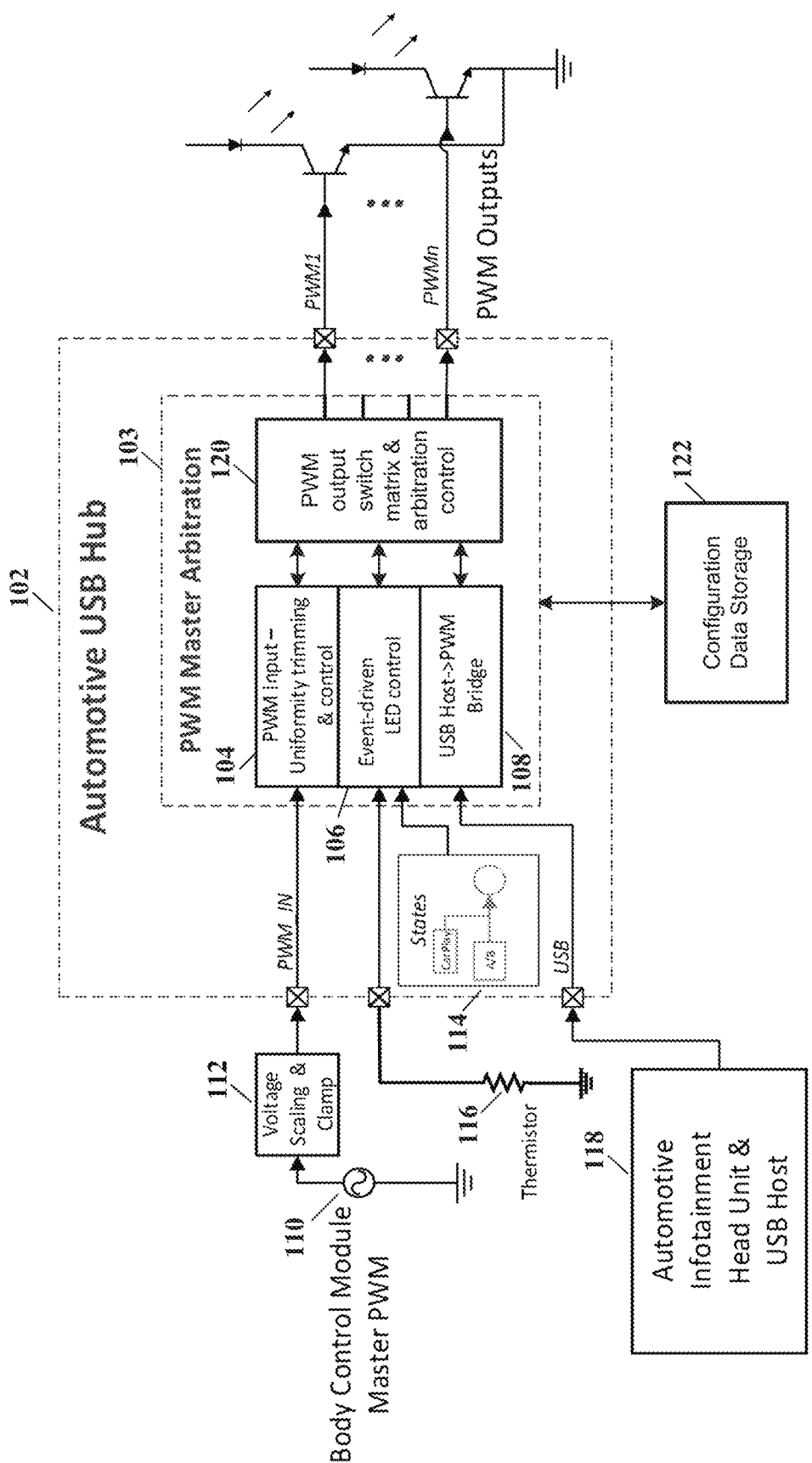
FIG. 1 illustrates a schematic block diagram of an automotive USB hub comprising PWM master arbitration, according to a specific example embodiments of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the forms disclosed herein.

DETAILED DESCRIPTION

A PWM lighting bridge provides for the management of hardware PWM compensation components. The hardware PWM compensation components perform the function of driving one or more PWM outputs based on a master PWM input signal. The master PWM input signal may be processed through a mapping function to produce the desired output signal(s) on the one or more PWM outputs. The mapping function may be provided by a set of compensation bins that may comprise, for example but are not limited to, a maximum input duty cycle, a minimum input duty cycle and an output duty cycle. The mapping process may select a bin based on determining whether the input duty cycle is within the minimum and maximum duty cycle ranges of the bins and then may use the specified output duty cycle for the one or more PWM outputs.

The PWM lighting bridge provides the facilities for configuration and runtime management of the hardware PWM compensation component. The configuration service provides the capability to specify a customizable configuration of the compensation bins and properties of the input and output PWM's. The runtime management service provides read/write access to the PWM compensation bins and specific details of the hardware interface to enable runtime calibration of the compensation bins.

A PWM resource manager of the PWM lighting bridge details the management of silicon hardware resources for PWM outputs. In a microcontroller unit (MCU) system various masters may require control of the PWM outputs for the master-specific application. The PWM resource manager provides the function of managing the allocation of the PWM outputs to the various masters. The allocation of the PWM output resources may be provided by a static configuration that is setup on initialization of the MCU system. The resource management may also provide the mechanism to dynamically change the allocation of PWM resources between the different masters.

As disclosed herein, "contextual" may be defined as the manner in which the LEDs are being illuminated may also be used to convey information, and different contexts would have unique vendor-specified schemes through which an observer can decode the context. This contextual information may be coming from multiple sources/origins (e.g., the sources/origins which are being arbitrated as described hereinafter) which provide unique/non-overlapping contexts about the environment this invention is being used in. The contexts may be encoded in singular or combined methods including but not limited to the following examples: the rate at which an LED fades-in/fades-out its brightness over time, the perceived on-time versus off-time of an LED, color of a LED, and/or any of the example encodings disclosed herein, but interpreted across a set of two or more LEDs.

Specific contexts may include but are not limited to: State of an infotainment technology (including but limited to: Android Auto, Apple CarPlay, Baidu Carlife), Identification of the USB port which is actively performing an infotainment technology function, power and/or battery charging status of a connected USB host/device, temperature or safety status of a module, vendor-specific service or troubleshooting codes, and/or status of a software/firmware upgrade/downgrade procedure of an element which may be connected to a module containing this invention.

According to the teachings of this disclosure, "multiple-master" LED illumination requirements may be handled through integrated circuitry, a USB control interface and software-based arbitration. Media infotainment systems and high-power consumer device charging may be integrated with an enhanced automotive USB hub architecture, and also interface with additional hardware peripherals comprising adjacent automotive computer communications interfaces, e.g., Pulse Width Modulation (PWM), Universal Serial Bus (USB), Local Interconnect Network (LIN), Controller Area Network (CAN bus) and the like.

According to specific embodiments of this disclosure, a configuration interface may be used to accomplish atomic functionalities including but not limited to:

1) configure pulse width modulation (PWM) outputs to be controlled algorithmically based upon a reference PWM input signal, which reference PWM input signal may encode lighting intent in the form of PWM duty cycle, voltage amplitude and/or frequency. Under this configuration, a systems designer can designate one or more PWM outputs to become dynamically enabled and reconfigured with new duty cycle and frequency parameters based upon detected PWM input frequency, duty-cycle and/or voltage amplitude. For example, a duty cycle-sensitive implementation of the first master 104 PWM lighting bridge would become effective toward the purpose of luminance compensation after factory calibration steps which make use of the configuration interface. In factory calibration, a combination of software and quantitative light-sensing measurement equipment may employ this configuration interface in order to yield multiple discrete lighting results via PWM outputs in correspondence to BCM-commanded light levels, which may become luminance-compensated through changes of PWM output duty cycle (as opposed to changes of bill of materials). The configuration interface would be used to perform actions including programming and storing one or more sets of PWM duty cycles into the input duty cycle bin matching function 222, the output duty cycle compensation lookup table (LUT) 224, and the PWM peripheral enables/control 226. The result of such calibration permits a duty cycle-sensitive implementation of PWM lighting bridge 104 to autonomously effect the luminance-compensated parameters upon lighting elements connected to PWM peripherals assigned through the PWM peripheral enables/control 226.

2) Configure one or more PWM outputs to become dynamically enabled and reconfigured with new duty cycle and frequency parameters based upon sideband bus interface commands from, for example but not limited to, a USB connected hosts, e.g., automotive infotainment module.

3) Configure one or more PWM outputs to become dynamically enabled and reconfigured with new duty cycle and frequency parameters based upon internal logic as a consequence of state changes initiated by, for example but not limited to: sideband bus transactions from USB, LIN, CAN, I$^2$C, and/or SPI connected devices; sensor measurement inputs, e.g., temperature, voltage, current, velocity; and/or internal hardware/firmware states.

Specific example embodiments may also include prioritization and arbitration over the PWM outputs, to override presently operating configurations in order to communicate/convey some context to the end-user. For example, a PWM input reference signal may have an intent to dim the lighting elements connected to one or more PWM outputs due to being in a nighttime environment, and those PWM outputs may be reconfigured as the system designer intended. However, when an interactive media session has been initiated, such as, for example but not limited to, Apple CarPlay or Android Auto, an override of the PWM outputs may be performed so as to communicate to the end-user that a state-change has occurred, by providing new lighting sequences (blinking/breathing) or brightness changes.

Referring now to the drawings, the details of example embodiments are schematically illustrated. Like elements in the drawings will be represented by like numbers, and similar elements will be represented by like numbers with a different lower-case letter suffix.

Referring to FIG. 1, depicted is a schematic block diagram of an automotive USB hub comprising PWM master arbitration, according to a specific example embodiments of this disclosure. An automotive USB hub 102 may have PWM master arbitration 103 comprising a first master 104 (PWM input-uniformity trimming and control), a second master 106 (event-driven LED control), a third master 108 (USB host to PWM bridge) and an output switch matrix and arbitration control 120. The output switch matrix and arbitration control 120 may provide prioritization and arbitration between the outputs from the first, second and third masters 104, 106 and 108 to the desired PWM outputs connected to the various dashboard LED modules. Configuration data for the first, second and third masters 104, 106 and 108 and be stored in configuration data storage 122 which may comprise a non-volatile memory. It is contemplated and within the scope of this disclosure that the PWM master arbitration 103 may be comprised of more or less than three masters. In addition, PWM master arbitration 103 may also function as a PWM resource manager that may be configured via non-volatile memory (not shown), as directed by the automotive USB hub 102, or via sideband interfaces such as, for example but not limited to, USB/I$^2$C/LIN devices. The first master 104 (PWM input-uniformity trimming and control) may also be referred to hereinafter as a "PWM lighting bridge" and may be reconfigured based on runtime PWM resource arbitration by the PWM output switch matrix and arbitration control 120.

The first master 104 may provide PWM input-based LED uniformity trimming and control, e.g., driven by a body control module (BCM) 110 as the PWM master. The first master 104 may be a configurable hardware engine for specifying a range of duty cycles based upon a PWM input thereto, PWM_IN, and map individually compensated duty-cycles (mapped so as to provide uniformity in trimming and control) for driving one or more PWM outputs. A voltage scaling and clamping circuit 112 may be coupled between the output of the BCM 110 and the PWM input of the first master 104. The voltage scaling and clamping circuit 112 may be used for voltage level translation between the BCM 110 PWM output and first master 104 PWM input. Closed-loop luminance uniformity trimming may be accomplished during factory calibration using an ambient light sensor to set each modules LEDs to a consistent light level. The master 104, which may act as a PWM lighting bridge, may also provide some feedback to external devices about the state of the arbitration performed by arbitration control 120, that may be occurring between the first, second and third masters 104, 106 and 108, respectively.

Figure 2:
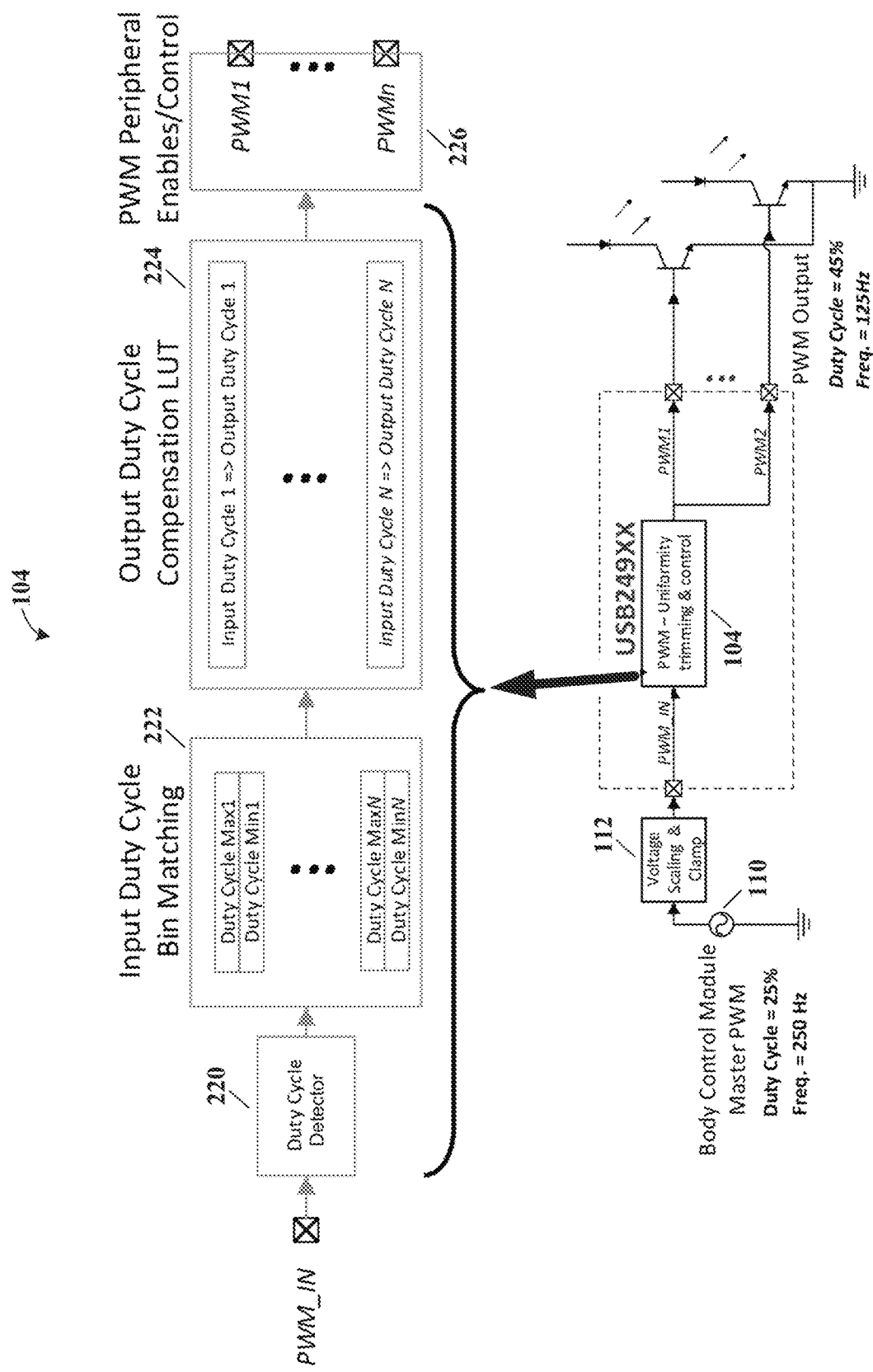
FIGS. 2, 4 and 5 illustrate schematic operational diagrams of the automotive USB hub, according to specific example embodiments of this disclosure.

Advantages of the first master 104 are LED PWM channel control responsive to the PWM output of the BCM 110 signaling and hardware engine configuration of the first master 104, as more fully described hereafter with reference to FIG. 2. No firmware execution from a higher level MCU is required for the LED PWM channel controlled by the BCM 110 signaling and hardware engine configuration of the first master 104. Thus, all LED PWM channel control responsive to the BCM 110 is contained within the first master 104, it being understood that the actual control of the LED modules is responsive to the PWM outputs selected through the output switch matrix and arbitration control 120, wherein the various outputs are denoted as PWM1 . . . PWMn.

Referring to FIG. 2, depicted is a more detailed schematic operational diagram of the PWM input-uniformity trimming and control (first master 104) of the automotive USB hub 102, according to specific example embodiments of this disclosure. The hardware engine of the first master 104 may comprise PWM duty cycle detector 220, an input duty cycle bin matching function 222, an output duty cycle compensation lookup table (LUT) 224, and a PWM peripheral enables/control 226. The PWM peripheral enables/control 226 comprises an interface to a set of one or more PWM peripherals, through which individual PWM channels may be, for example but not limited to, uniquely addressed, configured, enabled to output the result of their configuration and disabled.

The PWM duty cycle detector 220 determines a duty cycle value of the PWM input PWM_IN and provides the determined duty cycle value to the input duty cycle bin matching function 222. The input duty cycle bin matching function 222 compares each of the PWM signals 1 to N with a respective duty cycle range comprising a low limit minimum duty cycle and a high limit maximum duty cycle. If the detected duty cycle from the duty cycle detector 220 is between the low limit minimum duty cycle and the high limit maximum duty cycle, then the detected duty cycle from the duty cycle detector 220 is passed to the output duty cycle compensation LUT 224 where it is transformed (adjusted) to an output PWM signal having an appropriate duty cycle for correct LED light control of a respective dashboard module.

Figure 3:
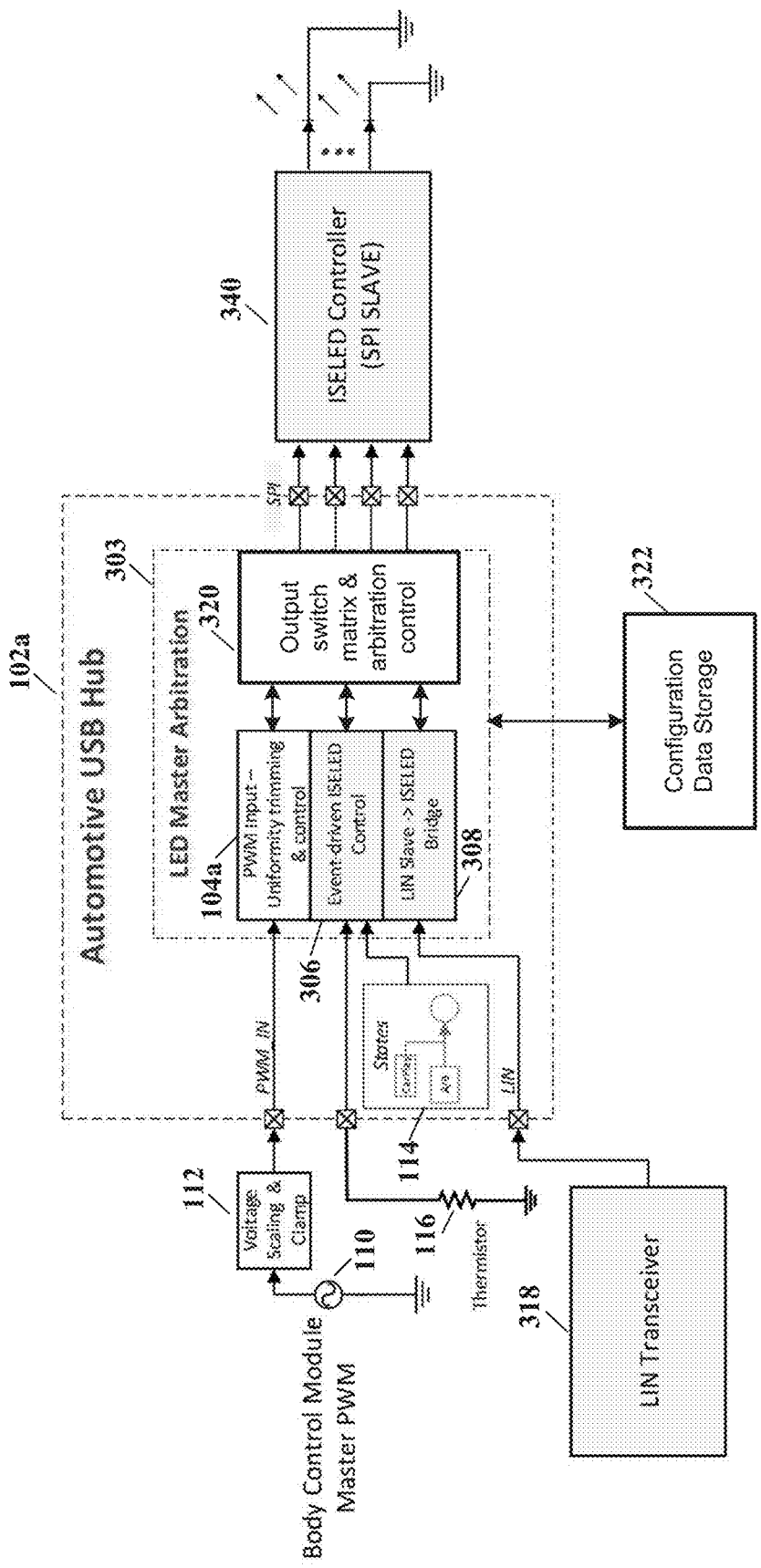
FIG. 3 illustrates another schematic block diagram of an automotive USB hub comprising PWM master arbitration, according to specific example embodiments of this disclosure.

Referring to FIG. 3, depicted is another schematic block diagram of an automotive USB hub comprising LED master arbitration, according to specific example embodiments of this disclosure. An automotive USB hub 102a may have a LED master arbitration function 303 comprising a first master 104a (PWM input-uniformity trimming and control), a second master 306 (event-driven ISELED control), a third master 308 (LIN slave to ISELED bridge), and an output switch matrix and arbitration control 320. The output switch matrix and arbitration control 320 may provide prioritization and arbitration between the outputs from the first, second and third masters 104a, 306 and 308 to the desired outputs, e.g., serial peripheral interface (SPI), connected to the various dashboard LED modules. Configuration data for the first, second and third masters 104a, 306 and 308 and be stored in configuration data storage 322 which may comprise a non-volatile memory. It is contemplated and within the scope of this disclosure that the LED master arbitration function 303 may be comprised of more or less than three masters. The first master 104a (PWM input-uniformity trimming and control) may also be referred to hereinafter as a "PWM lighting bridge" and may be reconfigured based on runtime resource arbitration by the output switch matrix and arbitration control 320.

The first master 104a may provide PWM input-based LED uniformity trimming and control, e.g., driven responsive to a body control module (BCM) 110 as the LED master. The first master 104a may be a configurable hardware engine to specify a range of duty cycles based upon a PWM input thereto, and map individually compensated duty-cycles (provide uniformity trimming and control) for converting the PWM_IN input to, for example but not limited to, SPI, and driving one or more serial peripheral interface (SPI) slaves 340, e.g., ISELED smart LED controller/drivers(s) through the output switch matrix and arbitration control 320. A voltage scaling and clamping circuit 112 may be coupled between the output of the BCM 110 and the PWM input of the first master 104a. The voltage scaling and clamping circuit 112 may be used for voltage level translation between the PWM output of the BCM 110 and first master 104 PWM input. Closed-loop luminance uniformity trimming may be accomplished during factory calibration using an ambient light sensor to set each modules LEDs to a consistent light level.

Advantages of the first master 104a are LED PWM channel control responsive to the PWM output of the BCM 110 signaling and hardware engine configuration of the first master 104a. No firmware execution from a higher level MCU is required for the LED PWM channel controlled responsive to the PWM output of the BCM 110 signaling and hardware engine configuration of the first master 104a. Thus, all LED PWM channel control responsive to the BCM 110 is contained within the first master 104a, it being understood that the actual control of the LED modules is responsive to the outputs selected through the output switch matrix and arbitration control 320.

The second master 306 functions in substantially the same way as the second master 106 of FIG. 1 except it drives a SPI slave device(s) 340 (ISELED controller/driver). The third master 308 may act as an automotive local interconnect network (LIN) transceiver to allow the LIN transceiver 318 to be the LED master. The third master 308 thereby allows the LEDs attached to the automotive USB hub 102a to be synchronized to states in the LIN transceiver 318. This also allows high-fidelity light effects, e.g., "breathing" (slowly fading of LED(s) on and off); multi-channel effects for LED accent (headlight) halo rings, and LED color control, to name a few applications thereof.

Figure 4:
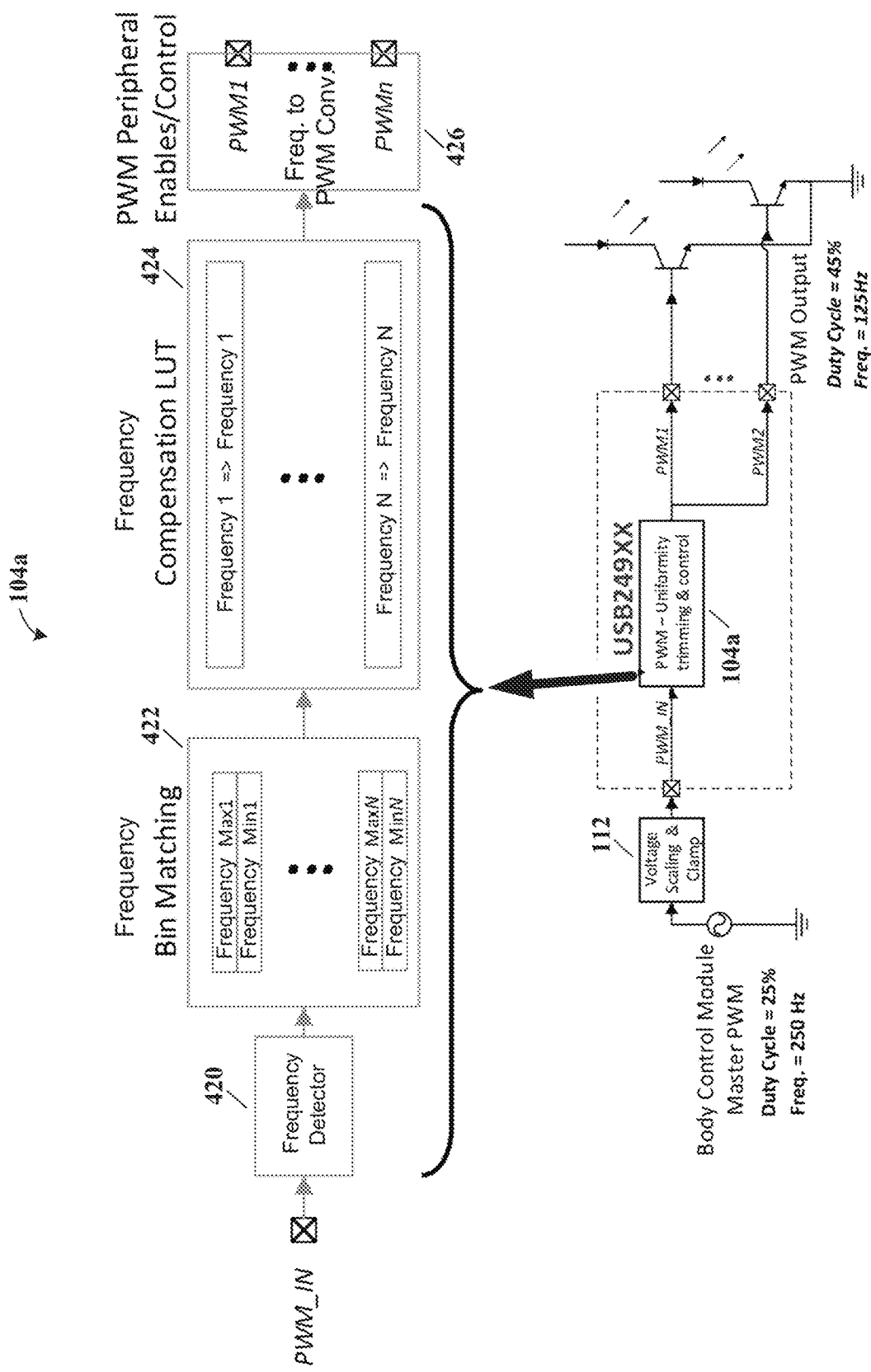

Referring to FIG. 4, depicted is a schematic operational diagram of the automotive USB hub 102, according to specific example embodiments of this disclosure. The hardware engine of the first master 104a, e.g., a second embodiment of the first master 104, may comprise frequency detector 420, a frequency bin matching function 422, a frequency compensation lookup table (LUT) 424, and PWM peripheral enables/control 426. The frequency detector 420 determines a frequency value of the PWM input PWM_IN and provides that frequency value to the frequency bin matching function 422. The frequency bin matching function 422 compares each frequency of the PWM_IN signals with a respective frequency range comprising a low limit minimum frequency and a high limit maximum frequency. If the detected frequency from the frequency detector 420 is between the low limit minimum frequency and a high limit maximum frequency, then the PWM_IN signal having that frequency is passed to the output frequency compensation LUT 424 where it is transformed (adjusted) to an output PWM signal having an appropriate duty cycle for correct LED light control of a respective dashboard module.

Figure 5:
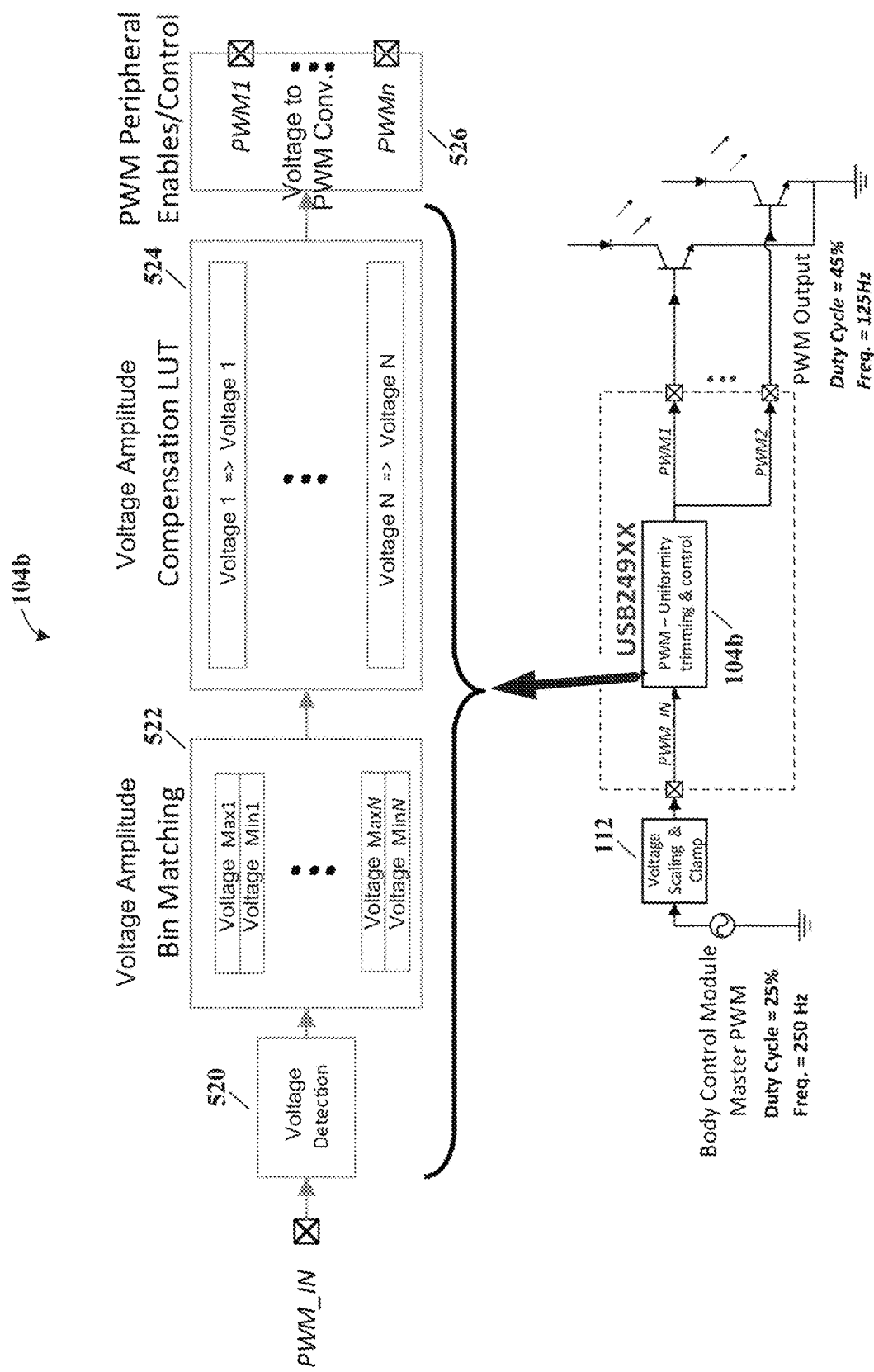

Referring to FIG. 5, depicted is a schematic operational diagram of the automotive USB hub, according to yet other specific example embodiments of this disclosure. The hardware engine of the first master 104b, e.g., a third embodiment of first master 104, may comprise voltage amplitude detector 520, a voltage amplitude bin matching function 522, a voltage amplitude compensation lookup table (LUT) 524, and PWM peripheral enables/control 526. The voltage amplitude detector 520 determines a voltage amplitude value of the PWM input PWM_IN and provides that voltage amplitude value to the voltage amplitude bin matching function 522. The voltage amplitude bin matching function 522 compares each of the voltage amplitudes of the PWM signals 1 to N with a respective voltage amplitude range comprising a low limit minimum voltage amplitude and a high limit maximum voltage amplitude. If the detected voltage amplitude from the voltage amplitude detector 520 is between the low and high limits voltage amplitude range then the PWM signal having that voltage amplitude is passed to the output voltage amplitude compensation LUT 424 where it is transformed (adjusted) to an output PWM signal having an appropriate duty cycle for correct LED light control of a respective dashboard module. The voltage amplitude detector 520 may be replaced by current amplitude detection (not shown) and operate in substantially the same way as the circuit and description above for the voltage amplitude detector 520, e.g., current maximum and minimum bin matching.

Referring back to FIG. 1, the second master 106 may be configured as an event-driven LED control, e.g., using firmware as a LED master. The second master 106 may control the USB hub 102 through the PWM output switch matrix and arbitration control 120 for indicating dynamic states of an automotive USB device 114 within automotive USB hub 102, such as, for example but not limited to, Apple CarPlay, Android Auto and the like, with spawned/active indication and control. The thermal threshold of a power charging system may be monitored with a temperature sensor 116, such as for example but not limited to, a thermistor coupled to an analog input of the second master 106, or through an analog-to-digital converter (not shown). Monitoring of this thermal threshold may cause reduced USB VBUS power availability, power balancing by reducing available power to a charging port, and/or indication that charging of a USB device, e.g., phone or tablet, has finished. It is contemplated and within the scope of this disclosure that the second master 106 may also monitor and react to temperature, voltage, current, velocity; and/or internal hardware/firmware state changes as programmed for desired applications.

The third master 108 may act as a USB host to PWM bridge, e.g., USB host 118 as the LED master. The third master 108 thereby allows the LED modules attached to the USB hub 102 to be synchronized to states in the USB host 118, e.g., automotive infotainment head unit as the automotive infotainment head unit and USB host 118. This also allows high-fidelity light effects, e.g., "breathing" (slowly fading of LED(s) on and off); multi-channel effects for LED accent (headlight) halo rings, and LED color control, to name a few applications thereof.

Module Use Cases

1. The PWM compensation component configuration use case may be configured in a hardware compensation block. In the hardware compensation block, compensation bin parameters for each compensation bin and the PWM input/output properties may be set, the PWM compensation component configuration may be programmed into the system configuration memory, and upon bootup the lighting bridge configures the hardware PWM compensation components (USB hub 102).
2. The PWM Compensation Bin Calibration use case provides for calibration of the duty cycle of the compensation bins. This comprises adjusting the duty cycle of a compensation bin to produce a desired PWM output based on an input PWM signal. The calibration process may be performed through a set of USB commands between the third master 108 and the USB host 118 that may provide the capability to dynamically adjust the duty cycle of a compensation bin and determine which compensation bin matches the input PWM signal, through an interface that exists between the third master 108 and the first master 104.

Once the PWM compensation bins and PWM input/output properties have been configured, a user may calibrate for luminance uniformity via USB commands which:
  a. Clear the bin match status and then apply a PWM signal with a set duty cycle on the PWM input.
  b. Read the matching bin status (which is a value output from the input duty cycle bin matching function 222) to verify the correct bin is found to a corresponding PWM input duty cycle. The matching bin is the current bin that is to be calibrated.
  c. Reads the PWM input measurement.
  d. Adjust the bin duty cycle over USB to provide a PWM Output duty cycle that produces the appropriate illumination intensity.
  e. Upon determining the appropriate illumination intensity, the current bin duty cycle may be saved for the static configuration value for that compensation bin, for reference by the output duty cycle compensation lookup table (LUT) 224.
  f. Repeat the aforementioned process for each compensation bin.

The PWM compensation bins maximum and minimum fields may be modified over a USB link at runtime. The PWM Lighting Bridge (first master 104) may be reconfigured based on runtime PWM resource arbitration by the output switch matrix and arbitration control 120, as more fully described hereinafter. PWM resource arbitration may provide the capability to dynamically manage the PWM outputs assigned to the PWM input(s) of the first, second and/or third masters 104, 106, and 108 based on the PWM resource arbitration. The PWM resources assigned thereto may be dynamically change due to a higher priority device claiming and releasing PWM outputs via the output switch matrix and arbitration control 120. PWM resource arbitration may appropriately handle reconfiguration of the PWM input based on the claiming and releasing of PWM outputs, and to save and restore PWM outputs that are claimed and released.

PWM resource management manages the silicon PWM output hardware resources. In a microcontroller unit (MCU) system various masters can require control of the PWM outputs for the master specific application. The PWM resource manager may provide the function of managing the allocation of the PWM outputs to the various masters, for example: services/tasks/co-routines being executed by the MCU which indicate internal thermal monitoring states, USB hub states, internal USB device states, external USB device states, USB downstream port connection states, USB upstream port connections states, data contents received via sideband bus/es, data contents received via USB downstream port devices, timer expirations, USB hub or MCU firmware upgrade/downgrade progress/results. The allocation of the PWM output resources may be provided by a static configuration that is setup on initialization of the MCU system. The resource management may also provide the mechanism to dynamically change the allocation of PWM resources between the different masters.

A PWM resources configuration use case describes the scenario where a user may assign the PWM Output resources to the master applications. For example, PWM outputs 1 through 8 may be assigned to the PWM Bridge (first master 104), and PWM outputs 9-12 to the USB PWM Bridge (third master 108). The PWM resources configuration may be written (stored) into the system configuration store. On boot the firmware configures the PWM allocation registers and the masters are setup based on the allocation of PWMs to the masters.

Runtime PWM Resource Arbitration may allow other modules in the system to claim and release PWM resource ownership/control at runtime using module priorities defined at build time. Notifications may be provided to inform modules when the resource ownership is given or taken. A priority scheme may be used to determine which module will be in control of the resource after the call to this service. Module ownership of a resource indicates that the module has sole control of the resource. A module claim of a resource indicates that the module would like to have ownership of the resource. At most one module may have ownership of a resource at any time. Multiple modules may have claims on a resource at any time. An error shall be reported by the service if an invalid module ID attempts to claim or release a resource.

Each resource claim request may be processed in the following ways:
1. If the claiming module (module A) has higher priority than the module that currently owns the resource (module B), then module B may be notified so that the resource ownership will be released, and module B may be allowed to complete any necessary actions. After module B completes its actions, ownership of the resource may then be passed to module A and a notification may be passed to module A. Any actions to be performed by module B prior to release of the resource may be performed prior to module A taking ownership of the resource. Module B may maintain a pending claim on the resource.
2. If the claiming module (module A) has the same or lower priority than the module that currently owns the resource (module B), then module B may maintain ownership of the resource and a pending claim may be created for module A.
3. When a module that has ownership of a resource releases its claim on that resource, ownership may be given to the remaining claiming module with the highest priority and a notification may be passed to any module that takes ownership. Modules with the same priority may be ordered in an implementation-specific way.

PWM resource ownership notifications may be provided by allowing modules (first, second and third masters 104, 106 and 108) in the system to be notified when they have been given ownership of a PWM resource, e.g., PWM outputs shown in FIG. 1. The output switch matrix and arbitration control 120 may manage which modules (first, second and third masters 104, 106 and 108, respectively) are trying to gain ownership to the PWM resources and may notify the modules when ownership has been transferred away from them.

The term "master" has been used throughout the disclosure above, but one having ordinary skill in the art would readily understand that the term "client" may also be used in some instances depending on the context of use. As used in this disclosure, "master": is an element in a system which contains a context for lighting (e.g., via the PWM resources mentioned herein) that may be controlled in a particular manner, and there is a need to arbitrate control over common/shared PWM resources to effect such lighting, between these different "masters". This arbitration is performed by a PWM resource manager. A "client": from the perspective of the PWM resource manager, may be an entity requiring access to common/shared PWM resources; effectively, a "client" is the logical representation of a "master" as described above, and is logically interfaced to the PWM resource manager for the purpose of arbitration. Multiple clients may be in contention over PWM resources at any given time, it is the duty of the PWM resource manager to provide priority and grant access according to parameters of the PWM resource manager's configuration; this is the act of "arbitration" between clients, and by extension, also the arbitration between masters.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

What is claimed is:

1. An automotive universal serial bus (USB) hub having light emitting diode (LED) master arbitration, comprising:
    a first master providing uniformity trimming and control of a pulse width modulation (PWM) input;
    a second master providing event driven PWM light emitting diode (LED) control; and
    a third master providing a USB host to a PWM bridge, wherein the first, second and third masters provide a plurality of PWM outputs.

2. The Automotive USB hub according to claim 1, wherein a PWM input of the first master is coupled to a master PWM output from a body control module.

3. The Automotive USB hub according to claim 2, further comprising a voltage scaling and clamp circuit coupled between the body control module PWM output and the first master PWM input.

4. The Automotive USB hub according to claim 1, wherein a temperature measuring device is coupled to a first input of the second master for indicating USB device power usage.

5. The Automotive USB hub according to claim 4, wherein the temperature measuring device is a thermistor and the first input of the second master is analog.

6. The Automotive USB hub according to claim 1, wherein a USB device is coupled to a second input of the second master.

7. The Automotive USB hub according to claim 6, wherein the USB device is selected from the group consisting of Apple Car Play and Android Auto.

8. The Automotive USB hub according to claim 6, wherein the second master provides spawned/activation indication and control of the USB device.

9. The Automotive USB hub according to claim 1, wherein the third master is coupled to a USB host.

10. The Automotive USB hub according to claim 9, wherein the USB host is an automotive infotainment head unit.

11. The Automotive USB hub according to claim 1, wherein the first master comprises:
    an input PWM duty cycle detector;
    an input PWM duty cycle bin matching function;
    an output PWM duty cycle compensation function; and
    a PWM peripheral enables/control of PWM outputs from the first master.

12. An automotive universal serial bus (USB) hub having light emitting diode (LED) master arbitration, comprising:
    a first master providing uniformity trimming and control of a pulse width modulation (PWM) input;
    a second master providing event driven PWM light emitting diode (LED) control; and
    a third master providing a USB host to a PWM bridge, wherein the first, second and third masters provide a plurality of outputs for driving serial peripheral interface (SPI) slaves.

13. The Automotive USB hub according to claim 12, wherein a PWM input of the first master is coupled to a master PWM output from a body control module.

14. The Automotive USB hub according to claim 13, further comprising a voltage scaling and clamp circuit coupled between the body control module PWM output and the first master PWM input.

15. The Automotive USB hub according to claim 12, wherein a temperature measuring device is coupled to a first input of the second master for indicating USB device power usage.

16. The Automotive USB hub according to claim 15, wherein the temperature measuring device is a thermistor and the first input of the second master is analog.

17. The Automotive USB hub according to claim 12, wherein a USB device is coupled to a second input of the second master.

18. The Automotive USB hub according to claim 17, wherein the USB device is selected from the group consisting of Apple Car Play and Android Auto.

19. The Automotive USB hub according to claim 17, wherein the second master provides spawned/activation indication and control of the USB device.

20. The Automotive USB hub according to claim 12, wherein the third master is coupled to an automotive local interconnect network (LIN) transceiver.

21. The Automotive USB hub according to claim 12, wherein the first master comprises:
- an input PWM duty cycle detector;
- an input PWM duty cycle bin matching function;
- an output PWM duty cycle compensation function; and
- a peripheral enables/control of SPI outputs from the first master.

* * * * *